(12) United States Patent
Choi et al.

(10) Patent No.: US 6,806,603 B1
(45) Date of Patent: Oct. 19, 2004

(54) FLAT TYPE VIBRATION MOTOR

(75) Inventors: Joon Choi, Kyungki-do (KR); Ki Hyung Kim, Seoul (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 10/704,702

(22) Filed: Nov. 12, 2003

(30) Foreign Application Priority Data

Jun. 20, 2003 (KR) .............................. 10-2003-0040022

(51) Int. Cl.[7] .............................................. H02L 7/06
(52) U.S. Cl. ........................ 310/81; 310/220; 310/248
(58) Field of Search .......................... 310/81, 219, 220, 310/238–242, 248–252, 40 MM, DIG. 6

(56) References Cited

U.S. PATENT DOCUMENTS

| | | | | |
|---|---|---|---|---|
| 3,959,679 A | * | 5/1976 | Buckley | ...................... 310/232 |
| 4,037,125 A | * | 7/1977 | Aoki | ............................ 310/248 |
| 5,793,133 A | * | 8/1998 | Shiraki et al. | ................. 310/81 |
| 6,359,364 B1 | * | 3/2002 | Yamaguchi et al. | ......... 310/248 |
| 6,522,037 B2 | * | 2/2003 | Lee et al. | .................. 310/68 R |
| 6,573,627 B2 | * | 6/2003 | Sun | .............................. 310/81 |

* cited by examiner

*Primary Examiner*—Dang Le
(74) *Attorney, Agent, or Firm*—Lowe Hauptman Gilman & Berner LLP

(57) ABSTRACT

A flat type vibration motor includes a rotor rotatably assembled between a stator and a housing, wherein the rotor includes an insulator of eccentric mass integrally containing at least a winding coil corresponding to the magnet and a weight arranged eccentrically adjacent to the winding coils, and an upper board mounted on an underside of the insulator; a plurality of brushes; a plurality of annular slip rings arranged on an underside of the upper board to be concentric with the shaft, each of the rings contacting an upper end of each of the brushes; and an IC chip for converting the direction of electric current flowing through the winding coils by alternating the polarity of electric current which is introduced to the slip rings via the brushes and then supplied to the winding coil.

18 Claims, 7 Drawing Sheets

PRIOR ART

FIG. 1

PRIOR ART

FIG. 2a

PRIOR ART

FLAT TYPE VIBRATION MOTOR

BACKGROUND OF THE INVENTION

1. Field of the Invention

The present invention relates to a vibration motor, and more particularly, to an improved vibration motor which can minimize mechanical friction and electric spark between brushes for receiving electric current and a commutator arranged in a rotor in order to prolong the lifetime of the motor as well as to enhance the reliability thereof.

2. Description of the Related Art

As well known in the art, a communication device generally uses a bell and a vibrator to inform a user of call incoming. A vibration mode typically actuates a small-sized vibration motor transferring driving force into a housing of the communication device to vibrate the communication device.

The vibration motor currently applied to a mobile telephone is discriminated into a flat type vibration motor (or coin type vibration motor) and a cylinder type vibration motor. The flat type vibration motor has a relatively simple vibration structure, e.g., of rotating a weight of high specific gravity which is placed inside the motor. The flat type vibration can be fabricated thin so that components of a mobile phone can be readily miniaturized. Owing to these advantages, application of the flat type vibration motor is gradually spreading.

Figure 1:
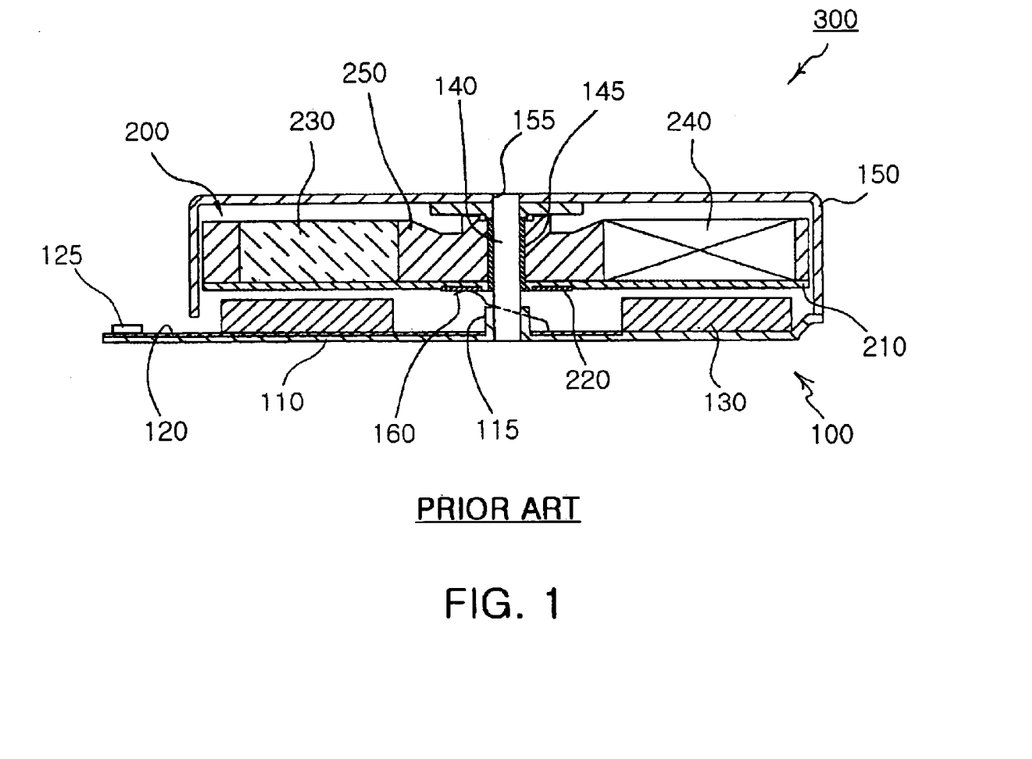
FIG. 1 is a sectional view of a conventional flat type vibration motor.
Figure 2A:
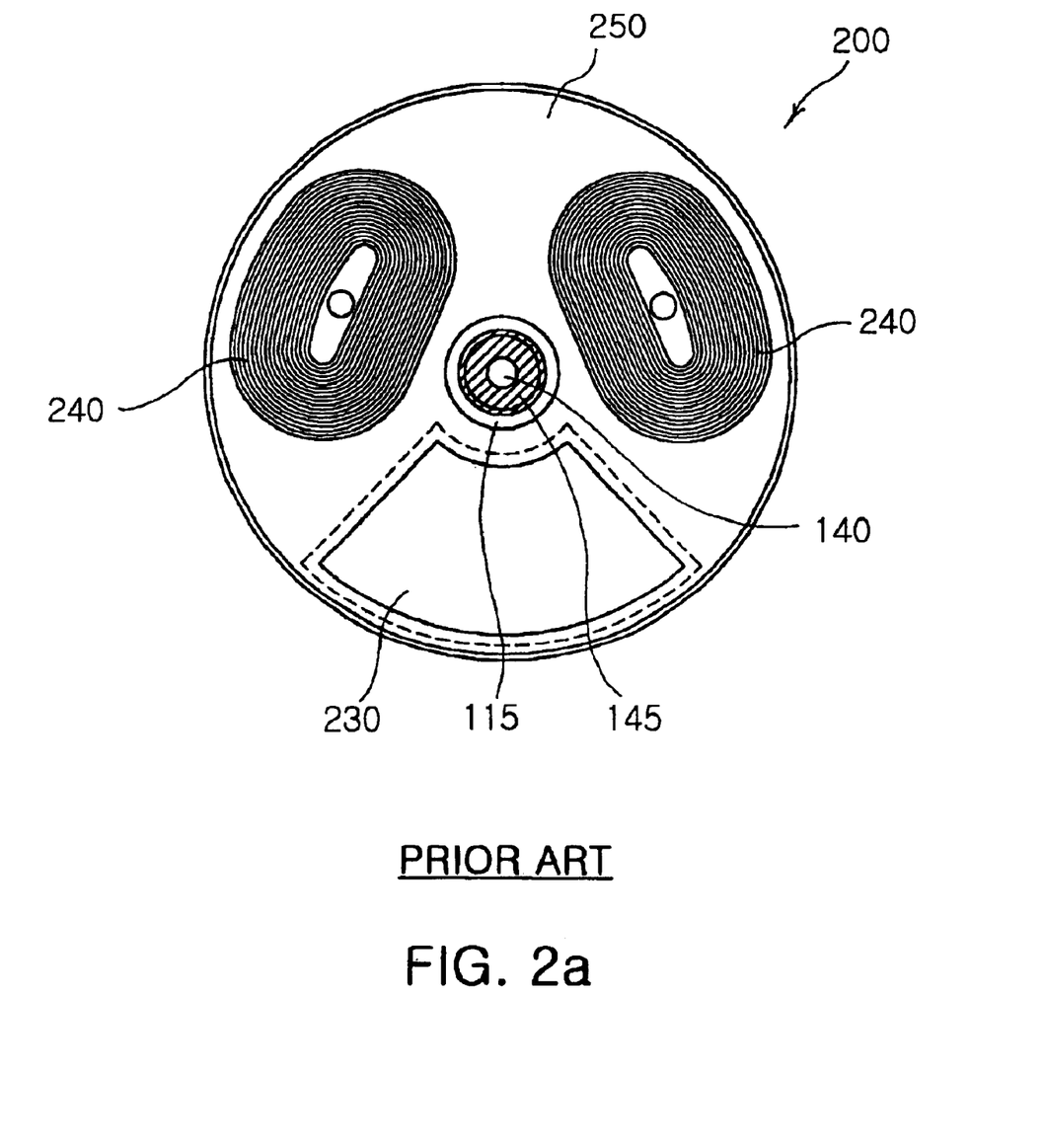
FIG. 2A is a plan view of the rotor.
Figure 2B:
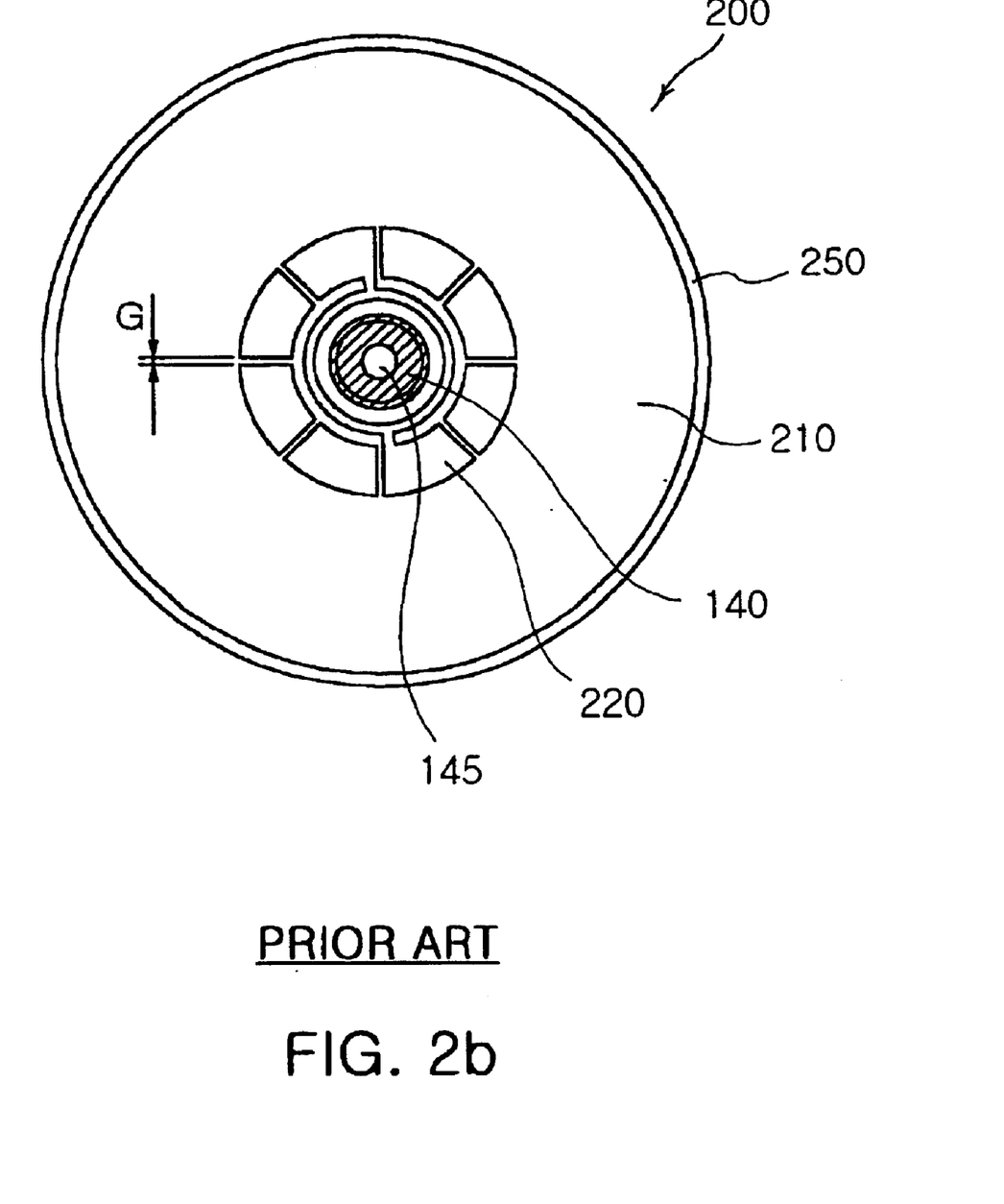
FIG. 2B is a bottom view thereof.

FIG. 1 is a sectional view of a conventional flat type vibration motor, and FIGS. 2A and 2B are plan and bottom views of a rotor of the flat type vibration motor. As shown in FIGS. 1 through 2B, the conventional flat type vibration motor 300 generally comprises a stator assembly 100 functioning as a stationary member (hereinafter will be referred to as "stator") and a rotor assembly 200 functioning as a rotary member (hereinafter will be referred to as "rotor").

The stator 100 includes a disk-like lower plate 110 having a cylindrical shaft holder 115 projected to a predetermined height from an upper central portion of the lower plate 110 for fixing the lower end of a shaft 140 via insert press. The stator 100 also includes a lower board 120 which is integrally attached to the upper face of the lower plate 110 and on which a circuit pattern is printed. A terminal unit 125 is mounted on a distal portion of the lower board 120 and connected with an external power supply (not shown).

An annular magnet 130 is mounted on the upper outer periphery of the lower plate 110, and has N and S poles in the outer periphery of the magnet 130 which are alternatingly magnetized to an equal interval.

The stator 100 also includes a pair of brushes 160 spaced from each other at a predetermined angle and arranged adjacent to an upper central portion of the lower board 120. Each of the brushes 160 is electrically connected with each of input and output terminals of the terminal unit 125.

A cylindrical housing 150 is coupled from above with the outer periphery of the lower plate 110 in order to protect the stator 100 and the rotor 200. A shaft hole 155 is formed in a central portion of the underside of the housing 150 to axially support the upper end of the shaft 140.

The rotor 200 is arranged rotatable about the stator 100 via the bearing member 145 of the shaft 140, and includes an upper plate 210, a commutator 220, a weight 230 and a pair of winding coils 240.

The upper plate 210 is arranged in the underside of an insulator 250, and the weight 230 and the winding coil 240 are integrally contained within the insulator 250 via insert injection molding. The commutator 220 has a number of segments which are buried in the underside of the upper board 210 around the center of rotation at a predetermined interval, exposing contact faces thereof. The segments are electrically connected with the upper ends of the brushes 160 through elastic contact.

The weight 230 is arranged between the winding coils 240 in order to maximize eccentricity in actuation of the motor, and made of high specific gravity material such as tungsten.

The winding coils 240 are opposed to each other on a common radius of rotation which is substantially equal to that of the magnet 130 placed under the winding coils 240. One of the winding coils 240 is supplied with electric current of a polarity, which is different from that of the other one of the winding coils 240 by the commutator 220 in contact with the brushes 160.

In the conventional vibration motor 300 of the above construction, when the lower plate 120 is supplied with electric current from the external power supply via the terminal unit 125, electric current is introduced into the commutator 220, which is arranged in the upper board 210 in elastic contact with the upper ends of the brushes 160, via the brushes 160 having lower ends electrically connected with the lower plate 120. Then, electric current is supplied from the commutator 220 via the circuit pattern printed on the upper board 210 into the winding coils 240.

In this case, magnetic fields created from the winding coils 240 and the magnet 130 interact with each other to generate electromagnetic force thereby rotating the rotor 200 in a direction. The commutator 220 periodically alternates the polarity of electric current supplied to the winding coils 240 as the winding coils 240 of the rotor 200 relatively change positions in respect to the magnet of the stator 100.

The rotor 200 having the weight 230 arranged eccentrically therein is rotated eccentrically in one direction around the shaft 140 as the center of rotation. Eccentric rotation of the rotor 200 is transferred via the shaft 140 to the lower plate 110 and the housing 150 to create vibration so that the vibration motor 300 can be used as a silent call device of a mobile communication device.

However, the above conventional vibration motor 300 has drawbacks that the brushes 160 cause mechanical abrasion or generate electric spark while passing through gaps G of the segments of the commutator 220 during rotation of the rotor 200. Then, byproducts such as black powder may be created to deteriorate the stability of electric contacts between the brushes 160 and the commutator 220, functioning as a major factor of degrading the performance of the vibration motor as well as creating noise. Such problems also resultantly shorten the lifetime of the vibration motor.

SUMMARY OF THE INVENTION

The present invention has been made to solve the foregoing problems and it is therefore an object of the present invention to provide an improved flat type vibration motor which can minimize mechanical friction and electric spark from brushes for conducting electric current between a stator and a rotor in order to prolong the lifetime of the motor as well as to prevent deterioration of motor performance thereby enhancing the reliability of an article.

According to an aspect of the invention for realizing the above objects, there is provided a flat type vibration motor for generating vibration in energization. The flat type vibration motor comprises: a stator including a lower board with a terminal unit, the terminal unit being supplied with electric current from an external power supply, and a magnet having N and S poles alternatingly magnetized in a periphery of the magnet; a shaft having a lower end fixedly pressed into an upper central portion of the stator and an upper end assembled into a lower central portion of a housing; a rotor rotatably assembled between the stator and the housing, wherein the rotor includes an insulator of eccentric mass, which integrally contains at least one winding coil corresponding to the magnet and a weight arranged eccentrically adjacent to the winding coil, and an upper board mounted on an underside of the insulator; a plurality of brushes electrically connected with the terminal unit and having lower ends fixed to the stator; a plurality of annular slip rings arranged in an underside of the upper board to have an axis concentric with the shaft, each of the rings contacting an upper end of each of the brushes; and an Integrated Circuit (IC) chip for converting the direction of electric current flowing through the winding coil by alternating the polarity of electric current which is introduced to the slip rings via the brushes and then supplied to the winding coil.

It is preferred that the brushes include a negative pole brush and a positive pole brush divided from the negative pole brush, the positive pole brush having a length different from that of the negative pole brush.

It is preferred that the upper ends of the brushes are inclined and placed over a top of the magnet.

It is preferred that the slip rings include a negative slip ring and a positive slip ring, the positive slip ring having an outside diameter different from that of the negative slip ring not to overlap with the positive slip ring.

It is preferred that each of the slip rings has an underside contacting the upper end of the each brush, wherein the underside is formed of a smooth flat face continued along a periphery of the each slip ring and having uniform surface roughness.

It is preferred that the IC chip is arranged in the upper board having a circuit pattern for electrically connecting the slip rings with the winding coil.

It is preferred that the slip rings and the brushes form at least one electric contact.

According to another aspect of the invention for realizing the above objects, there is provided a flat type vibration motor for generating vibration in energization, comprising: a housing; a shaft having an upper end supported to the housing; a rotor rotatably arranged within the housing, and including at least one winding coil, a weight eccentrically arranged adjacent to the winding-coil and a plurality of annular slip rings arranged in an underside of an upper base; an Integrated Circuit (IC) chip arranged in an upper face of the upper base for converting the direction of current flowing through the winding coil; a stator having a magnet arranged in a lower base thereof, the magnet having N and S poles alternatingly magnetized in an outer periphery thereof; and a plurality of brushes having one ends correspondingly contacted with the slip rings and the other ends electrically connected with a terminal unit which is supplied with electric current.

It is preferred that the upper base comprises a printed circuit board having a circuit pattern formed in an upper face of the printed circuit board to electrically connect the slip rings with the winding coil, wherein the IC chip is arranged in the upper face of the printed circuit board.

It is preferred that each of the slip rings comprises an annular conductive metal member which is attached to the underside of the upper base and arranged concentric with the shaft.

It is preferred that each of the slip rings comprises an annular conductive pattern which is printed on the underside of the upper base and arranged concentric with the shaft.

It is preferred that the slip rings comprise a negative slip ring and a positive slip ring, the positive slip ring having an outside diameter different from that of the negative slip ring not to overlap with the positive slip ring.

It is preferred that the brushes include a negative pole brush and a positive pole brush divided from the negative pole brush, the positive pole brush having a length different from that of the negative pole brush.

It is preferred that the upper ends of the brushes are inclined and placed over a top of the magnet.

It is preferred that each of the slip rings has an underside contacting the upper end of the each brush, wherein the underside is formed of a smooth flat face continued along a periphery of the each slip ring and having uniform surface roughness.

It is preferred that the slip rings and the brushes form at least one electric contact.

It is preferred that the lower base comprises a lower board having a circuit pattern formed on an upper face thereof for connecting the terminal unit with the brushes.

It is also preferred that the rotor further includes an insulator of eccentric mass integrally having a weight therein, the weight being eccentrically arranged adjacent to the winding coil.

BRIEF DESCRIPTION OF THE DRAWINGS

The above and other objects, features and other advantages of the present invention will be more clearly understood from the following detailed description taken in conjunction with the accompanying drawings, in which:

FIGS. 2A and 2B illustrate a rotor of the conventional flat type vibration motor, in which

FIGS. 6A and 6B illustrate a rotor adopted in the flat type vibration motor of the invention, in which FIGS. 7A and 7B illustrate alternatives to the rotor adopted in the flat type vibration motor of the invention, in which

DETAILED DESCRIPTION OF THE PREFERRED EMBODIMENT

The following detailed description will present preferred embodiments of the invention in reference to the accompanying drawings.

Figure 3:
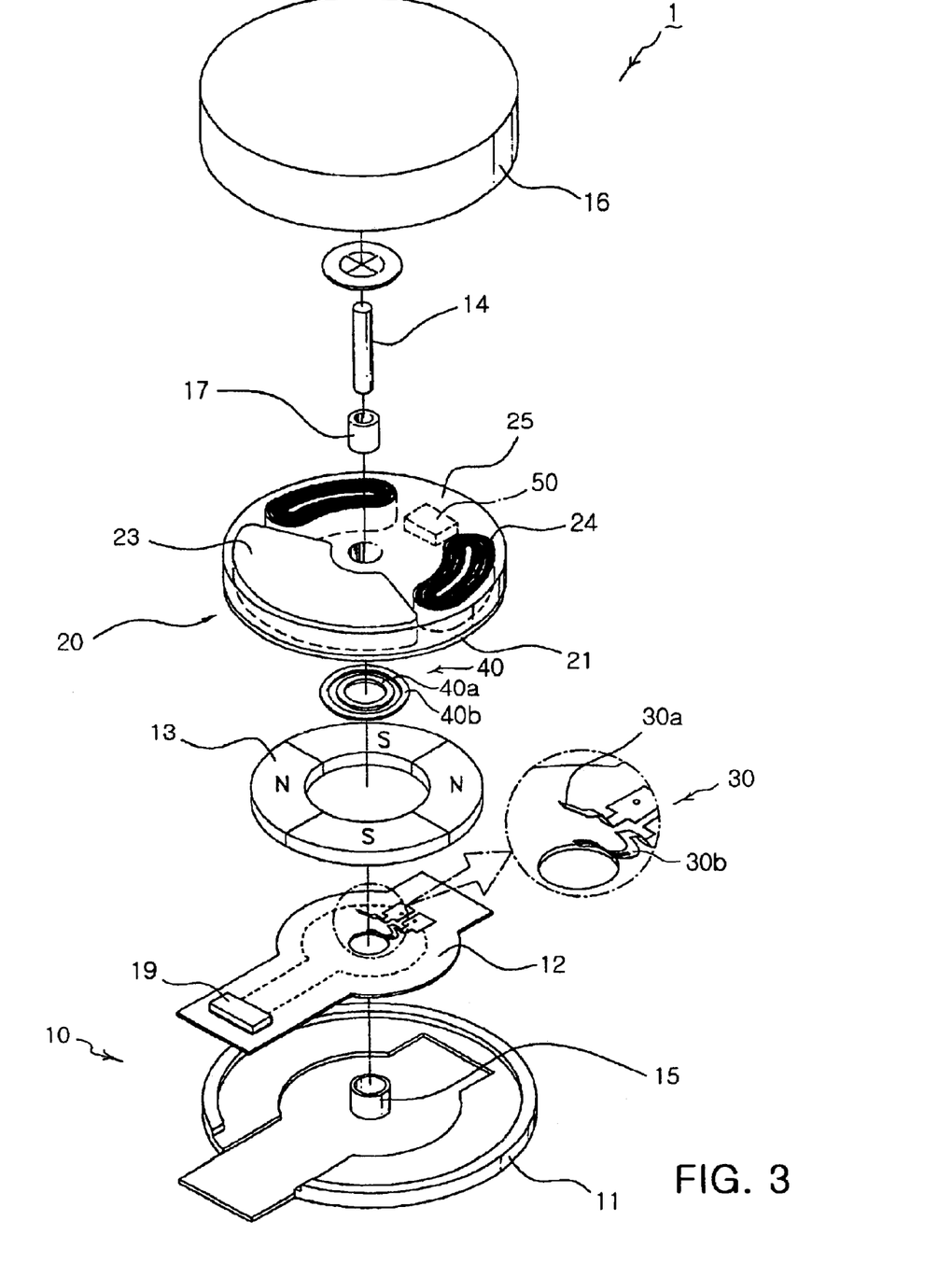
FIG. 3 is an exploded perspective view of a flat type vibration motor of the invention.
Figure 4:
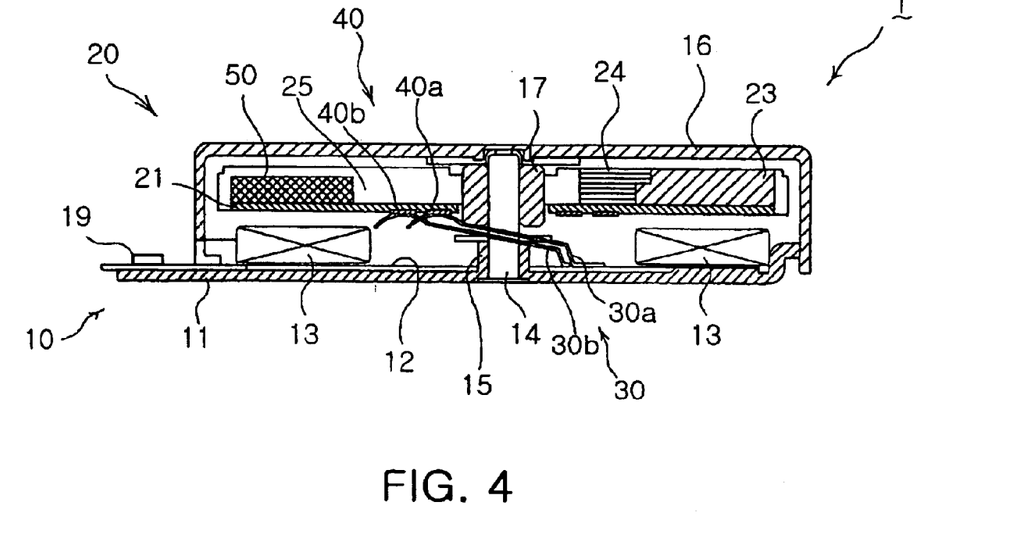
FIG. 4 is a sectional view of the flat type vibration motor of the invention.
Figure 5:
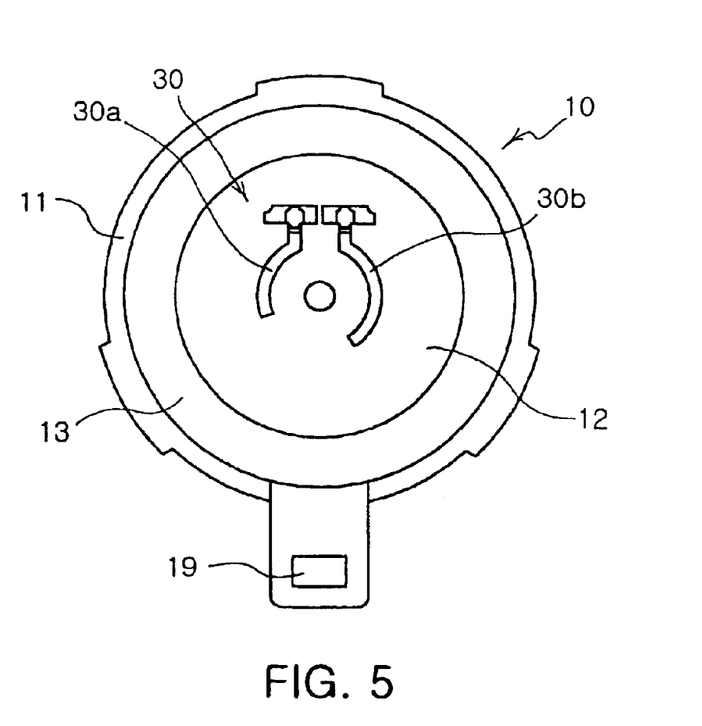
FIG. 5 is a plan view of a stator adopted in the flat type vibration motor of the invention.
Figure 6A:
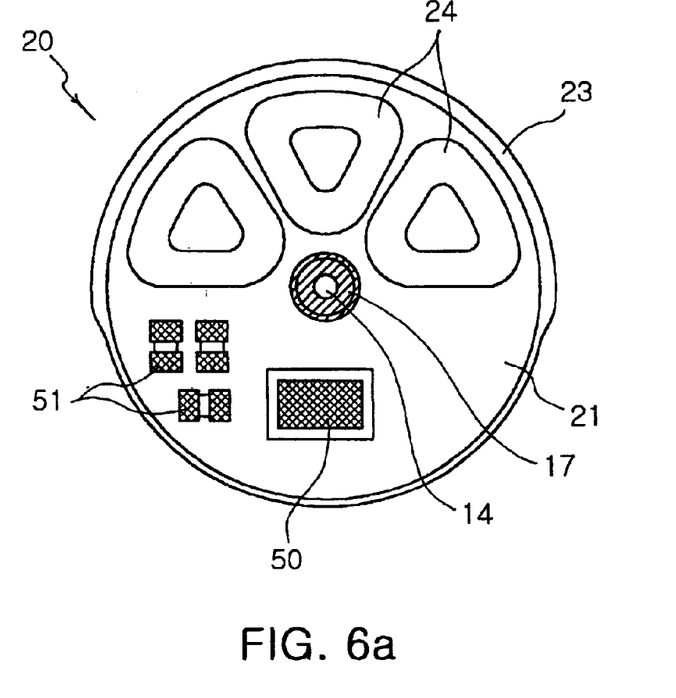
FIG. 6A is a plan view of the rotor.
Figure 6B:
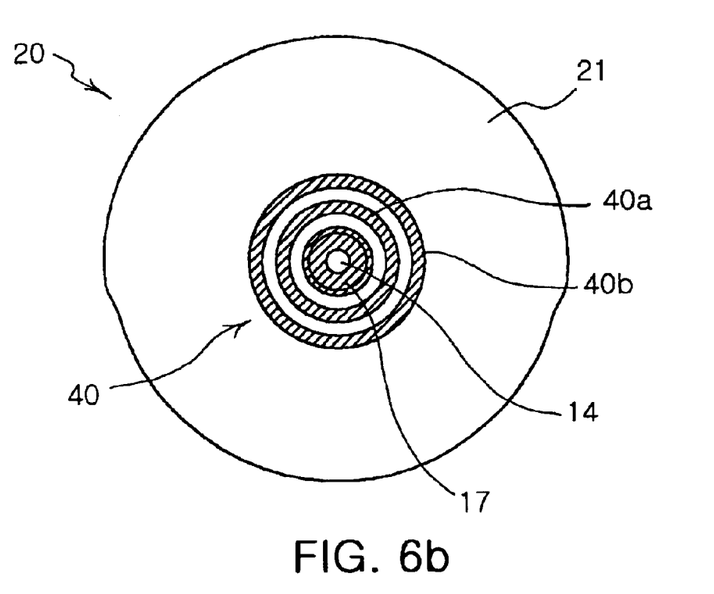
FIG. 6B is a bottom view thereof.

In the accompanying drawings, FIG. 3 is an exploded perspective view of a flat type vibration motor of the invention, FIG. 4 is a sectional view of the flat type vibration motor of the invention, FIG. 5 is a plan view of a stator adopted in the flat type vibration motor of the invention, and FIGS. 6A and 6B are plan and bottom views illustrating a rotor adopted in the flat type vibration motor of the invention.

As shown in FIGS. 3 through 6B, the flat type vibration motor 1 of the invention comprises a stator 10, a rotor 20, a pair of brushes 30, a pair of slip rings 40 and an Integrated Circuit (IC) chip 50 in order to generate vibration as silent call while minimizing mechanical abrasion and electric spark of the brushes which conduct electric current for driving rotation between the stator 10 and the rotor 20.

The stator 10 includes a disk-like lower plate 11 having a cylindrical shaft holder 15 projected to a predetermined height from an upper central portion of the lower plate 11 so that the lower end of a shaft 14 is assembled into the shaft holder 15. The stator 10 also includes a lower board 12 which is integrally attached to the upper face of the lower plate 11. A terminal unit 19 is mounted on a distal portion of the lower board 12 and connected with an external power supply.

Also, a circuit pattern is printed on the lower board 12 mounted with the terminal unit 19, and a through hole is perforated in the lower board 12 so that the shaft holder 15 is arranged in the through hole without interference with the lower board 12.

The stator 10 also includes a magnet 13 adjacent to the upper outer periphery of the lower plate 11, which has N and S poles alternatingly magnetized along the periphery of the magnet 13. The magnet 13 is made of a permanent magnet having 2, 4, 6, . . . , or 2n number of alternatingly magnetized N and S poles. Because the number of related components within the stator 10 increases in proportion to the number of poles of the magnet 13, the poles of the magnet 13 are preferably numbered 2, 4 or 6 to simplify the components of the stator 10.

The shaft 14 in the form of an elongated member of a predetermined length is assembled vertically to a central portion of the lower plate 11, and has a bearing member 17 placed around a middle portion in length of the shaft 14. A housing 16 is in the form of a cylindrical cover opened at the bottom and coupled with the outer circumference of the lower plate 11 to internally contain the magnet 13, the brushes 30 and the rotor 20 arranged above the lower plate 11.

The rotor 20 includes an upper board 21 having a circuit pattern printed thereon and attached to the underside of the rotor 20, a weight 23 arranged eccentrically in the top of the upper board 21 without a circuit pattern, and two winding coils 240 arranged adjacent to the weight 23. The winding coils 24 are opposed to each other on a common radius of rotation which is substantially equal to that of the magnet 13 of the stator 10.

In order to enhance the eccentric mass of the rotor 20, an insulator 25 for example made of resin is molded to integrally contain the weight 23 and the winding coils 24 therein. The upper board 21 is also integrally bonded to the underside of the insulator 25 in injection molding of the insulator 25.

The brushes 30 have one ends or lower ends which are fixed to the lower board 12 to be electrically connected with the terminal unit 19, which is in connection with the external power supply, via the circuit pattern formed in the top of the lower board 12 or any other electric connector means.

The brushes 30 are divided into a negative pole brush 30a and a positive pole brush 30b which are electrically connected with a negative terminal and a positive terminal branched from the terminal unit 19. The brushes 30a and 30b are fixed in position to the lower board 12 via fixing members such as bolts. Alternatively, the brushes 30a and 30b may be fixed in position to the lower board 12 via soldering to facilitate electric connection between the lower board 12 and a circuit pattern section.

It is preferred that the negative and positive pole brushes 30a and 30b have different lengths to facilitate contact with a negative pole slip ring 40a and positive pole slip ring 40b of outside diameters different from each other.

The brushes 30 are arranged and inclined upward within the inner periphery of the magnet 13 to avoid interference with the magnet 13 so that the upper ends of the brushes 30 are placed over the top of the magnet 13 to elastically contact and support the slip rings 40.

The slip rings 40 are in the form of annular ring members which are integrally mounted on a central portion of the underside of the upper board 21 to have a common axis concentric with the shaft 14. The slip rings 40 include the negative and positive pole slip rings 40a and 40b which have diameters different from each other so that the negative and positive slip rings 40a and 40b contact the upper ends of the negative and positive pole brushes 30a and 30b respectively, but do not overlap with each other.

Each of the upper ends of the brushes 30 contacts the underside of each slip ring 40a or 40b in which the underside is preferably formed of a smooth and flat face continuous along the periphery with uniform surface roughness.

The slip rings 40 and the brushes 30 are so arranged to form at least one electric contact.

The IC chip 50 is mounted on the upper board 21 of the rotor 20, and serves to periodically alternate the polarity of electric current supplied to the winding coils 24 of the rotor 20 in order to periodically convert the direction of electric current supplied to the winding coils 24, in which electric current is introduced to the negative and positive pole slip rings 40a and 40b via the negative and positive pole brushes 30a and 30b which are fixedly mounted on the stator 10 before supplied to the winding coils 24. Preferably, the IC chip 50 is internally mounted with a Hall effect sensor or Hall sensor (not shown) which functions to detect the position of the magnet 13 having the N and S poles alternatingly magnetized along the periphery thereof and to transfer a detection signal to the IC chip 50. Alternatively, the Hall sensor may be externally mounted on the IC chip 50.

As shown in FIGS. 6A and 6B, the IC chip 50 on the upper board 21 is arranged between circuit portions for connecting the slip ring 40 with the winding coils 24 in order to convert the direction of electric current which is supplied from the slip rings 40 toward the winding coils 24 according to the number of poles of the magnet 13.

Figure 7A:
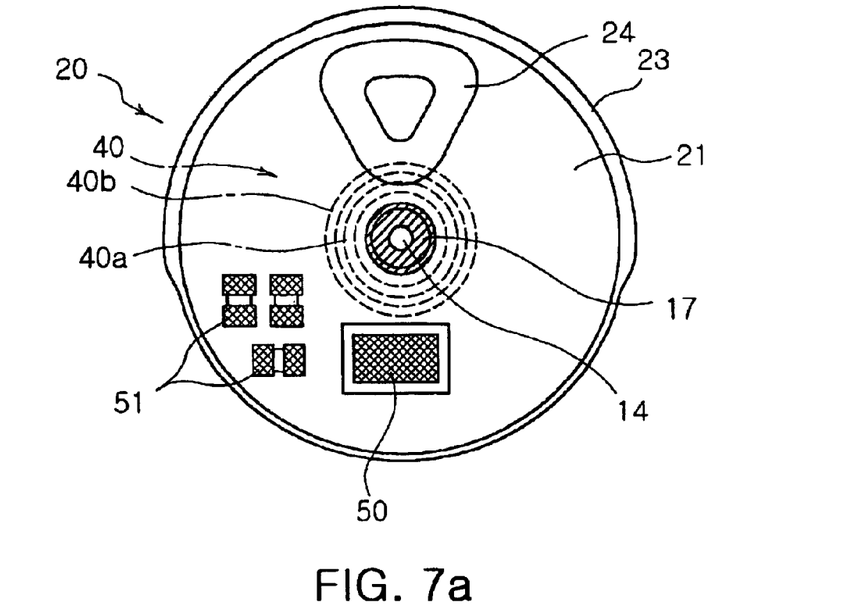
FIG. 7A is a plan view of an alternative to the rotor which includes two winding coils and an IC chip mounted on the rotor.
Figure 7B:
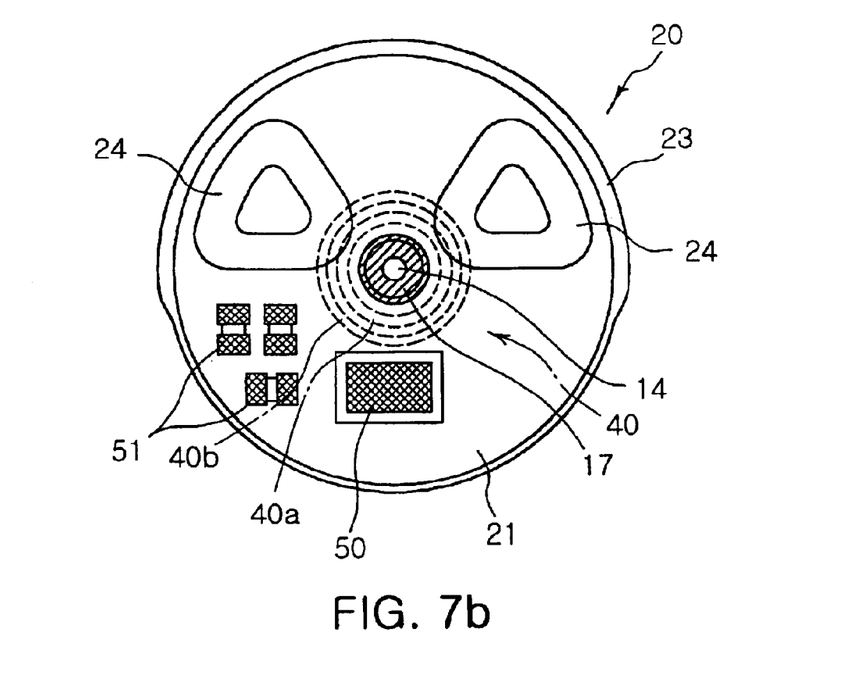
FIG. 7B is a plan view of another alternative to the rotor which includes one winding coil and an IC chip mounted on the rotor.

FIGS. 7A and 7B illustrate alternatives to the rotor adopted in the flat type vibration motor of the invention, in which FIG. 7A is a plan view of an alternative to the rotor which has two winding coils and an IC chip mounted on the rotor, and FIG. 7B is a plan view of another alternative to the rotor which has one winding coil and an IC chip mounted on the rotor. As shown in FIGS. 7A and 7B, the rotor 20 of the vibration motor of the invention has at least one winding coil 24, and the IC chip 50 is arranged in an upper portion of the upper board 21 without interference with the winding coil 50 (FIG. 7A) or the winding coils (FIG. 7B).

When the flat type vibration motor 1 of the above construction is supplied with electric current from the external power supply, electric current supplied to the terminal unit 19 mounted on the lower board 12 of the stator 10 is introduced to the brushes 30 having the negative and positive pole brushes 30a and 30b via the circuit pattern in the lower board 12.

Because the surfaces of the annular slip rings 40a and 40b arranged integrally in the underside of the upper board 21 continuously maintain sliding contact with the upper ends of the brushes 30a and 30b in which the lower ends of the brushes are fixed to the lower board 12, electric current introduced to the negative pole brush 30a and the positive pole brush 30b of the brushes 30 is supplied continuously and stably toward the upper board 21 without interruption while the rotor 20 rotates about the stator 10 which is fixed in position.

Electric current supplied to the slip rings 40 periodically converts its direction in response to the detection signal from the Hall sensor functioning to detect the magnet 13, which has the N and S poles alternatingly magnetized in the periphery thereof, while flowing through the IC chip 50 arranged between the circuit portions for electrically connecting the slip rings 40 with the winding coil(s) 24.

As a result, the polarity of electric current supplied to the winding coil(s) 24 is alternated from negative to positive and positive to negative so that the winding coil(s) 24 is/are magnetized by electric current, which is periodically converted in direction, to generate electromagnetic force with the magnet 13.

Electromagnetic force generated between the winding coil(s) 24 and the magnet 13 causes the rotor 20 assembled between the stator 10 and the housing 16 via the bearing member 17 of the shaft 14 to rotate in one direction about the shaft 14 as the center of rotation.

Since the weight 23 is eccentrically arranged in the rotor during rotation, eccentric driving force is outwardly transferred via the shaft to vibrate the entire communication device.

According to the present invention as set forth above, the slip rings are arranged in the underside of the rotor to perform sliding contact with the upper ends of the brushes supplied with electric current from the external power supply and the IC chip is arranged in the rotor to alternate the polarity of electric current supplied toward the winding coil(s) so as to stably supply electric current as well as to minimize mechanical abrasion and electric spark of the brushes when the rotor rotates about the shaft in respect to the stator. As a result, the invention reduces creation of byproducts such as black powder to prolong the lifetime of the vibration motor while enhancing the performance thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A flat type vibration motor for generating vibration, comprising:
    a stator including a lower board with a terminal unit, the terminal unit being supplied with electric current from an external power supply, and a magnet having N and S poles alternatingly magnetized in a periphery of the magnet;
    a shaft having a lower end fixedly pressed into an upper central portion of the stator and an upper end assembled into a lower central portion of a housing;
    a rotor rotatably assembled between the stator and the housing, wherein the rotor includes an insulator of eccentric mass, which integrally contains at least one winding coil corresponding to the magnet and a weight arranged eccentrically adjacent to the winding coil, and an upper board mounted on an underside of the insulator;
    a plurality of brushes electrically connected with the terminal unit and having lower ends fixed to the stator;
    a plurality of annular slip rings arranged on an underside of the upper board to have an axis concentric with the shaft, each of the rings contacting an upper end of each of the brushes; and
    an Integrated Circuit (IC) chip for converting the direction of electric current flowing through the winding coil by alternating the polarity of electric current which is introduced to the slip rings via the brushes and then supplied to the winding coil.

2. The flat type vibration motor as set forth in claim 1, wherein the brushes include a negative pole brush and a positive pole brush divided from the negative pole brush, the positive pole brush having a length different from that of the negative pole brush.

3. The flat type vibration motor as set forth in claim 1, wherein the upper ends of the brushes are inclined and placed over a top of the magnet.

4. The flat type vibration motor as set forth in claim 1, wherein the slip rings include a negative slip ring and a positive slip ring, the positive slip ring having an outside diameter different from that of the negative slip ring not to overlap with the positive slip ring.

5. The flat type vibration motor as set forth in claim 1, wherein each of the slip rings has an underside contacting the upper end of the each brush, wherein the underside is formed of a smooth flat face continued along a periphery of the each slip ring and having uniform surface roughness.

6. The flat type vibration motor as set forth in claim 1, wherein the IC chip is arranged in the upper board having a circuit pattern for electrically connecting the slip rings with the winding coil.

7. The flat type vibration motor as set forth in claim 1, wherein the slip rings and the brushes form at least one electric contact.

8. A flat type vibration motor for generating vibration, comprising:
    a housing;
    a shaft having an upper end supported by the housing;
    a rotor rotatably arranged within the housing, and including at least one winding coil, a weight eccentrically arranged adjacent to the winding coil and a plurality of annular slip rings arranged on an underside of an upper base,
    an Integrated Circuit (IC) chip arranged in an upper face of the upper base for converting the direction of current flowing through the winding coil;
    a stator having a magnet arranged in a lower base thereof, the magnet having N and S poles alternatingly magnetized in an outer periphery thereof; and
    a plurality of brushes having one ends correspondingly contacted with the slip rings and the other ends electrically connected with a terminal unit which is supplied with electric current.

9. The flat type vibration motor as set forth in claim 8, wherein the upper base comprises a printed circuit board having a circuit pattern formed in an upper face of the printed circuit board to electrically connect the slip rings with the winding coil, wherein the IC chip is arranged in the upper face of the printed circuit board.

10. The flat type vibration motor as set forth in claim 8, wherein each of the slip rings comprises an annular conductive metal member which is attached to the underside of the upper base and arranged concentric with the shaft.

11. The flat type vibration motor as set forth in claim 8, wherein each of the slip rings comprises an annular conductive pattern which is printed on the underside of the upper base and arranged concentric with the shaft.

12. The flat type vibration motor as set forth in claim 8, wherein the slip rings comprise a negative slip ring and a positive slip ring, the positive slip ring having an outside diameter different from that of the negative slip ring not to overlap with the positive slip ring.

13. The flat type vibration motor as set forth in claim 8, wherein the brushes include a negative pole brush and a positive pole brush divided from the negative pole brush, the positive pole brush having a length different from that of the negative pole brush.

14. The flat type vibration motor as set forth in claim 8, wherein the upper ends of the brushes are inclined and placed over a top of the magnet.

15. The flat type vibration motor as set forth in claim 8, wherein each of the slip rings has an underside contacting the upper end of the each brush, wherein the underside is formed of a smooth flat face continued along a periphery of the each slip ring and having uniform surface roughness.

16. The flat type vibration motor as set forth in claim 8, wherein the slip rings and the brushes form at least one electric contact.

17. The flat type vibration motor as set forth in claim 8, wherein the lower base comprises a lower board having a circuit pattern formed on an upper face thereof for connecting the terminal unit with the brushes.

18. The flat type vibration motor as set forth in claim 8, wherein the rotor further includes an insulator of eccentric mass integrally having a weight therein, the weight being eccentrically arranged adjacent to the winding coil.

* * * * *